(12) United States Patent
Sanderson

(10) Patent No.: US 8,048,549 B2
(45) Date of Patent: Nov. 1, 2011

(54) LIQUID METAL HEAT EXCHANGER FOR HIGH TEMPERATURE FUEL CELLS

(75) Inventor: Robert Sanderson, Wethersfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 690 days.

(21) Appl. No.: 12/233,447

(22) Filed: Sep. 18, 2008

(65) Prior Publication Data
US 2010/0068563 A1  Mar. 18, 2010

(51) Int. Cl.
*H01M 2/06* (2006.01)
(52) U.S. Cl. .......................... 429/34; 428/13
(58) Field of Classification Search ............ 429/34, 429/36, 38, 13, 26
See application file for complete search history.

(56) References Cited

U.S. PATENT DOCUMENTS

| 7,189,469 | B2 * | 3/2007 | Tarver | 429/495 |
| 2006/0210858 | A1 | 9/2006 | Warrier et al. | |

FOREIGN PATENT DOCUMENTS

| JP | 2526390 A | 6/1996 |
| JP | 2000-319007 A | 11/2000 |

OTHER PUBLICATIONS

The above references were cited in an International Search Report and Written Opinion of Apr. 27, 2010 issued in the counterpart PCT Patent Application No. PCT/US2009/056892.

* cited by examiner

*Primary Examiner* — David Vu

(74) *Attorney, Agent, or Firm* — Cowan, Liebowitz & Latman, PC

(57) ABSTRACT

A heat exchanger for a fuel cell stack includes a first plate and a second plate. The first and second plates are connected to one another by at least one wall. The first and second plates and the at least one wall form an enclosure having an interior area defined by interior surfaces of the enclosure. At least one liquid metal and transfer means are disposed within the interior area. The liquid metal flows within the transfer means and the interior area in response to a temperature gradient applied to the enclosure.

16 Claims, 7 Drawing Sheets

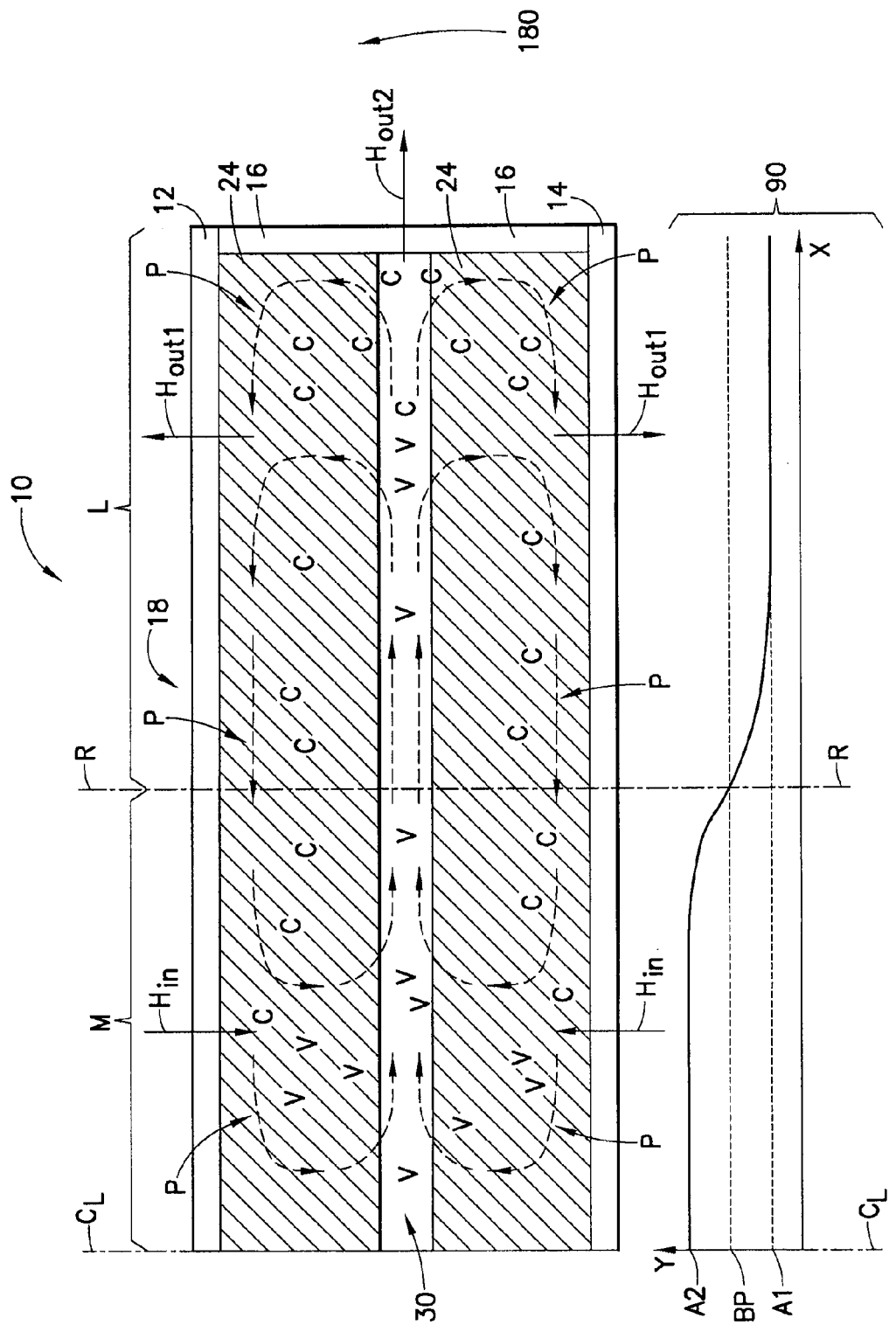

LIQUID METAL HEAT EXCHANGER FOR HIGH TEMPERATURE FUEL CELLS

FIELD OF THE INVENTION

The present invention is generally directed to a heat exchanger for high temperature fuel cells and is more specifically directed to a heat exchanger with a liquid metal contained therein.

BACKGROUND OF THE INVENTION

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air. The anode and cathode are disposed on opposing sides of an electrolyte material which conducts electrically charged ions therebetween. The electrolyte material and the design of the fuel cell determine the type and performance of the fuel cell. For example, Solid Oxide Fuel Cells (SOFC) utilize electrolytes made from ceramic materials and have high operating temperatures, in the range of 700-900 degrees Celsius.

SOFCs can be quite large, for example SOFC stacks typically include many individual fuel cells disposed between separators and compressed together in the stack to facilitate electrical conductivity across the SOFC stack. The individual fuel cells can have a large cross sectional area. Heating and/or cooling the SOFC stacks to and from the operating temperature of about 700-900 degrees Celsius can cause significant temperature gradients over the large cross sectional areas. Such temperature gradients can impart thermal stresses on the SOFC stack which can cause misalignment and/or distortion of the individual fuel cells. Such misalignment and/or distortion can degrade compression between the fuel cells thereby reducing the electrical conductivity across the SOFC stack and/or reducing the performance of the SOFC stack.

SUMMARY OF THE INVENTION

According to one aspect of the present invention, a heat exchanger is used for reducing thermal gradients in a fuel cell stack, for example in Solid Oxide Fuel Cell (SOFC) stacks. The heat exchanger has a first plate and a second plate spaced apart from and positioned generally opposite the first plate. The first and second plates are connected to one another by generally opposing side walls which all cooperate to form an enclosure having an interior area defined by interior surfaces. At least a portion of the interior surfaces have a porous coating applied thereon. The porous coating defines a plurality of capillaries extending therethrough. Portions of the porous coating extend between portions of the opposing surfaces thereby defining at least one porous bridge. The porous coating and the porous bridges have exposed surfaces which cooperate with one another to define at least one cavity within the interior area. A liquid metal is disposed within at least a portion of at least one of the interior area, the cavities and the porous coating.

As discussed in detail below, during operation of a SOFC stack, the heat exchanger is subject to a temperature gradient that in turn induces the liquid metal to flow in the interior area, for example in the capillaries defined by the porous coating. In addition, the heat exchanger has at least one area, generally referred to as an evaporation area, which is subject to temperatures that at least periodically, reach or exceed the boiling point of the liquid metal. Thus a metal vapor is formed in the evaporation areas. The heat exchanger also has at least one other area, generally referred to as a condensation area, in which temperatures are generally below the boiling point of the liquid metal. At least a portion of the metal vapor flows in the capillaries and/or the cavities into the condensation area where at least a portion of the metal vapor is condensed into the liquid metal. Subsequently, at least a portion of the liquid metal enters the capillaries and flows by capillary action to the evaporation area where the liquid metal is heated as described above.

The present invention also resides in a fuel cell stack having a plurality of fuel cells stacked along a common axis. Each of the fuel cells has an anode and a first conduit positioned adjacent to the anode. Each of the fuel cells also has a cathode and a second conduit positioned adjacent to the cathode. In addition, each of the fuel cells has an electrolyte disposed between the anode and the cathode. The first conduit is in fluid communication with a fuel supply and is configured to channel fuel to the anode for reaction therewith. The second conduit is in fluid communication with an air supply and is configured to channel air to the cathode for reaction therewith. The fuel cell stack also includes one of the heat exchangers described above disposed between adjacent fuel cells. In one embodiment of the present invention, the heat exchanger includes an extension portion which generally protrudes from the fuel cell stack.

The present invention also resides in a method for operating the fuel cell stack whereby a fuel cell stack including a plurality of fuel cells is provided. A heat exchanger is also provided and is disposed between adjacent fuel cells. The heat exchanger has a first plate and a second plate spaced apart from and positioned generally opposite the first plate. The first and second plates are connected to one another by generally opposing side walls which together cooperate to form an enclosure having an interior area defined by interior surfaces. At least a portion of the interior surfaces have a porous coating applied thereon. The porous coating defines a plurality of capillaries extending therethrough. Portions of the porous coating extend between opposing portions of the interior surfaces thereby defining at least one porous bridge. The porous coating and the porous bridges have exposed surfaces which cooperate with one another to define at least one cavity within the interior area. A liquid metal is disposed within at least a portion of at least one of the interior area, the cavities and the porous coating.

During initial startup of the fuel cell stack, an external heat source heats the fuel cell stack to its operating temperature. Once the fuel cell stack is operating, heat from an electrochemical reaction within the fuel cell stack maintains the operating temperature. Heat from at least one of the fuel cells is transferred to adjacent heat exchangers which have at least one evaporation area that is subject to temperatures that at least periodically, reach or exceed the boiling point of the liquid metal. A coolant, preferably an oxidant, is flowed over a portion of the heat exchanger, generally referred to as a condensation area, to maintain the temperature of at least a portion of the condensation area below the boiling point of the liquid metal. The evaporation area and the condensation area are in fluid communication with one another through at least the capillaries and the cavity. The fuel cell is further heated causing at least portions of the evaporation area to reach or exceed the boiling point of the liquid metal and causing at least a portion of the liquid metal to evaporate and form a metal vapor. At least a portion of the metal vapor is transported to the cavity between the capillaries. At least a portion of the metal vapor flows in the cavity from the evaporation area to the condensation area where at least a portion of the metal vapor condenses into the liquid metal and enters the capillaries. Next, at least a portion of the liquid metal is transported in the capillaries to the evaporation area for further heating and evaporation as described above.

DESCRIPTION OF THE DRAWINGS

FIG. 9 is a schematic representation of the fluid circulation and heat transfer mechanisms of the heat exchanger.

DETAILED DESCRIPTION OF THE PREFERRED EMBODIMENTS

Figure 1:
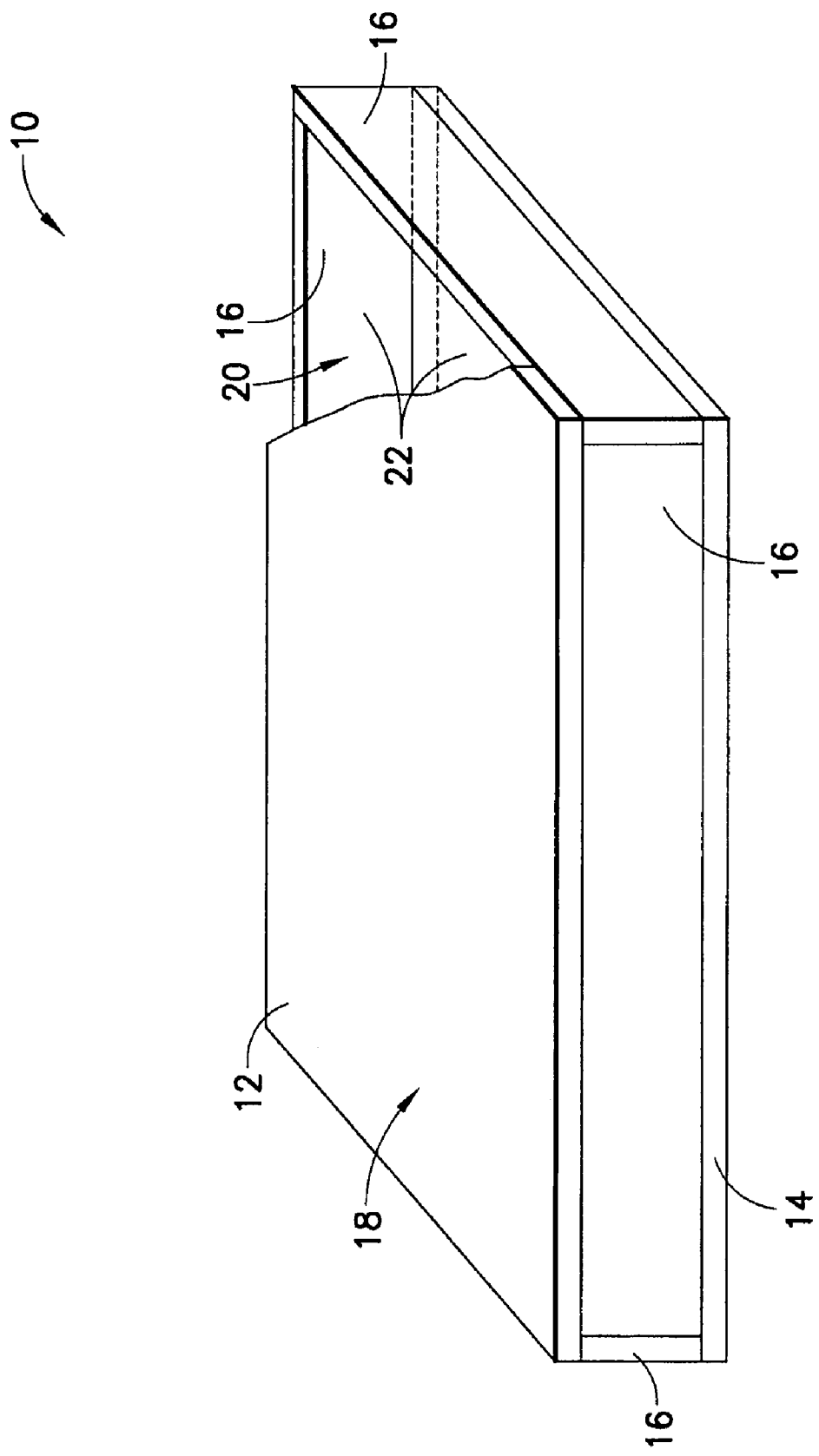
FIG. 1 is a perspective view of a heat exchanger in accordance with the teachings of the present invention.

As shown in FIG. 1, a heat exchanger for use in reducing thermal gradients in a Solid Oxide Fuel Cell (SOFC) stack is generally designated by the reference number 10. The heat exchanger 10 includes a first plate 12 and a second plate 14 spaced apart from and positioned generally opposite the first plate. The first and second plates, 12 and 14 respectfully, are connected to one another by four generally opposing side walls 16. Preferably, the first and second plates, 12 and 14 respectively, and the side walls 16 are made of metal to provide the structural integrity and the thermal and electrical conductivity useful in operating of the SOFC. The first and second plates, 12 and 14 respectively, and the side walls 16 cooperate to form an enclosure 18 having an interior area 20 defined by interior surfaces 22. While the first plate 12 and the second plate 14 are described, the present invention is not limited in this regard as other configurations such as but not limited to castings, forgings and pipes can be employed without departing from the broader aspects of the present invention. Moreover, while the first plate 12 and the second plate 14 are described as being connected by four generally opposing side walls, the present invention is not limited in this regard as other configurations including but not limited to any number of side walls and plates connected by other members including but not limited to pipes, tubes, castings and forgings can also be employed. In addition, the first plate 12, the second plate 14 and the side walls 16 are not limited to being made of metal, as other electrically conductive materials, can also be employed.

A liquid metal (not shown) is disposed in the interior area 20. The liquid metal is preferably potassium which has a melting point of approximately 64 degrees Celsius and a boiling point of approximately 759 degrees Celsius. The liquid metal is preferably electrically conductive. Although the liquid metal is described as being potassium, other liquid metals and combinations thereof, including at least one of: 1) sodium which has a melting point of approximately 98 degrees Celsius and a boiling point of about 883 degrees Celsius and 2) potassium and 3) other metals, can also be employed.

Figure 2:
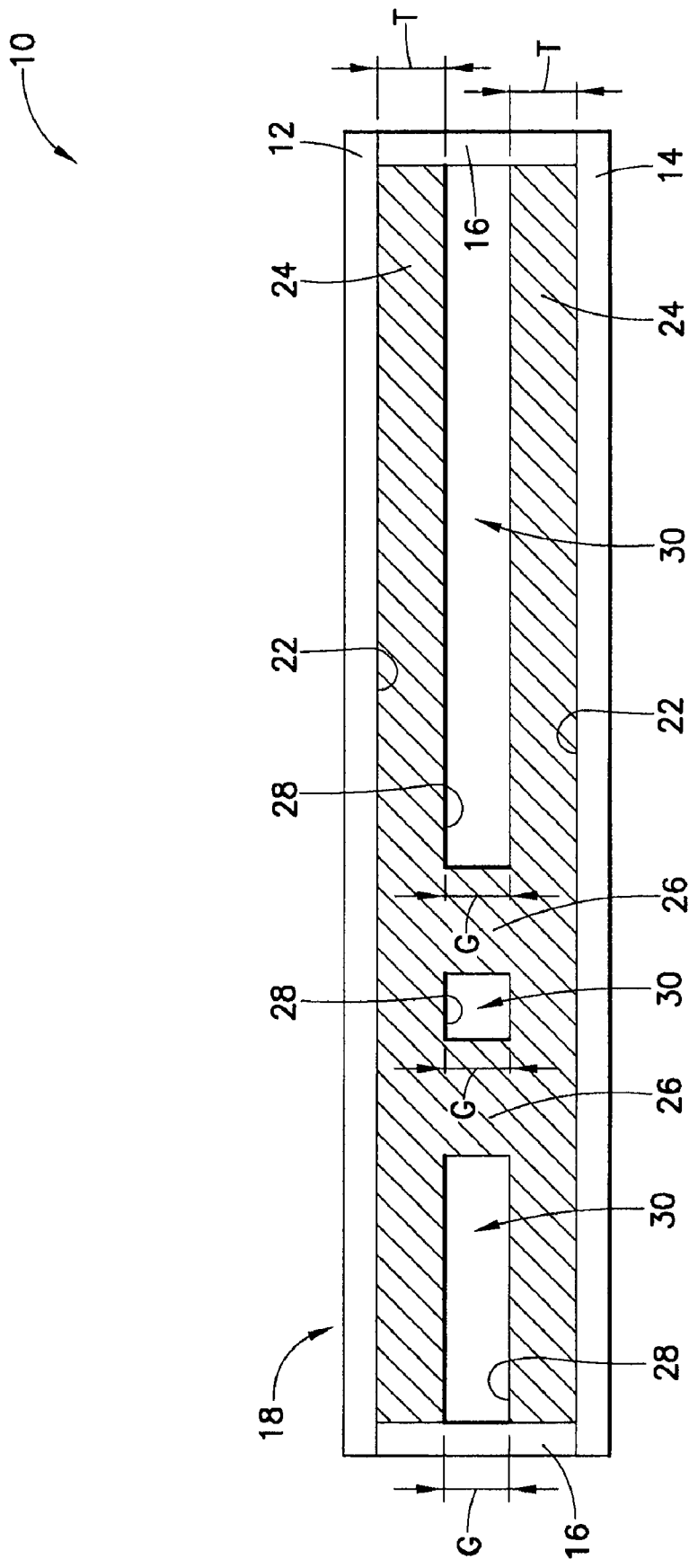
FIG. 2 is a front view of the heat exchanger of FIG. 1 with one wall removed.

As shown in FIG. 2, portions of the interior surfaces 22 of the first and second plates, 12 and 14 respectively, have a porous coating 24 of a thickness T applied thereon. The porous coatings 24 are spaced approximately equally apart from one another by three gaps G. In addition, two portions of the porous coatings 24 extend between the first plate 12 and the second plate 14 and join one another to define two porous bridges 26. The porous coatings 24 and the porous bridges 26 have exposed surfaces 28 which cooperate with one another to define three interconnected cavities 30 within the interior area 20 which are in fluid communication with one another. The cavities 30 accommodate phase changes of the liquid metal (not shown), for example, to accommodate evaporation of the liquid metal into a metal vapor (not shown). Preferably, the porous coatings 24 and the porous bridges 26 are metal, for example nickel and are electrically and/or thermally conductive. While two portions of the porous coatings are described as extending between the first plate 12 and the second plate 14, the present invention is not limited in this regard, as portions of the porous coating extending between opposing portions of the interior surface and/or between transversely disposed portions of the interior surfaces can also be employed without departing from the broader aspects of the present invention.

Figure 3:
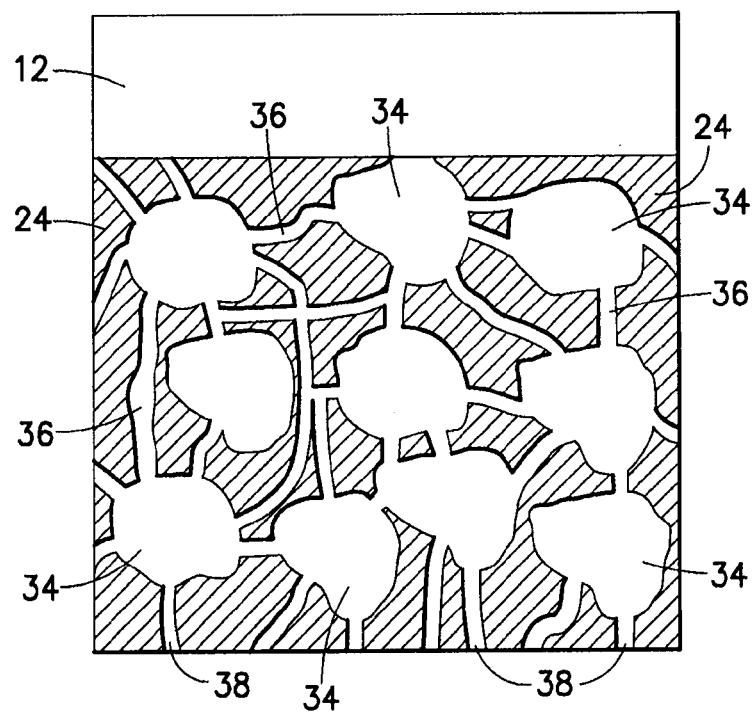
FIG. 3 is a schematic view of a representative portion of the heat exchanger of FIG. 2.
Figure 4:
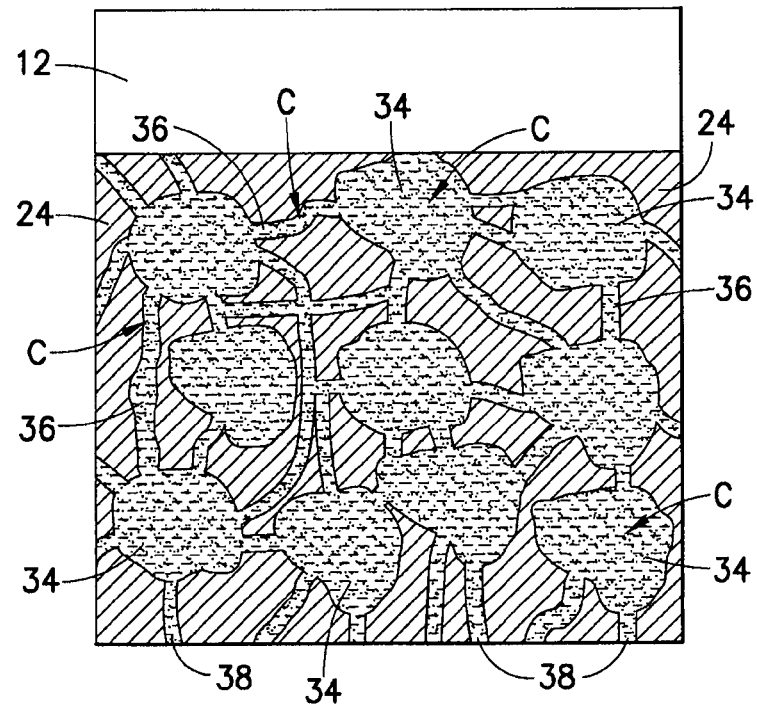
FIG. 4 illustrates the portion of the heat exchanger of FIG. 3 with a liquid metal contained therein.

As illustrated in FIG. 3, the porous coatings 24 include a plurality of voids 34 contained therein. At least a portion of the voids 34 are connected to one another by capillaries 36 and at least a portion of the capillaries are connected to one another. The capillaries 36 connect to pores 38 which are in fluid communication with the cavities 30. As shown in FIG. 4, the voids 34 and the capillaries 36 contain the liquid metal C. During operation, the liquid metal C is transported in the porous coatings 24, for example in the capillaries 36 and/or voids 34, in response to a temperature gradient applied to the enclosure 18. While the thickness of the porous coatings 24 is described as being a common thickness T, the present invention is not limited in this regard as porous coatings of different thicknesses and/or variable thicknesses can also be employed without departing from the broader aspects of the present invention. Although, the porous coatings 24 extend between the first and second plates, 12 and 14 respectively, and join one another to define two porous bridges 26, the present invention is not limited in this regard as coatings having other configurations including but not limited to those having a plurality of porous bridges, no bridges, and metal bridges can also be employed. While the exposed surfaces 28 are described as defining three cavities 30 within the interior area 20, the present invention is not limited in this regard as other numbers and configurations of cavities, including but not limited to a plurality of cavities, a continuous cavity, cylindrical bores and randomly dispersed voids within the porous coatings can also be employed.

Figure 5:
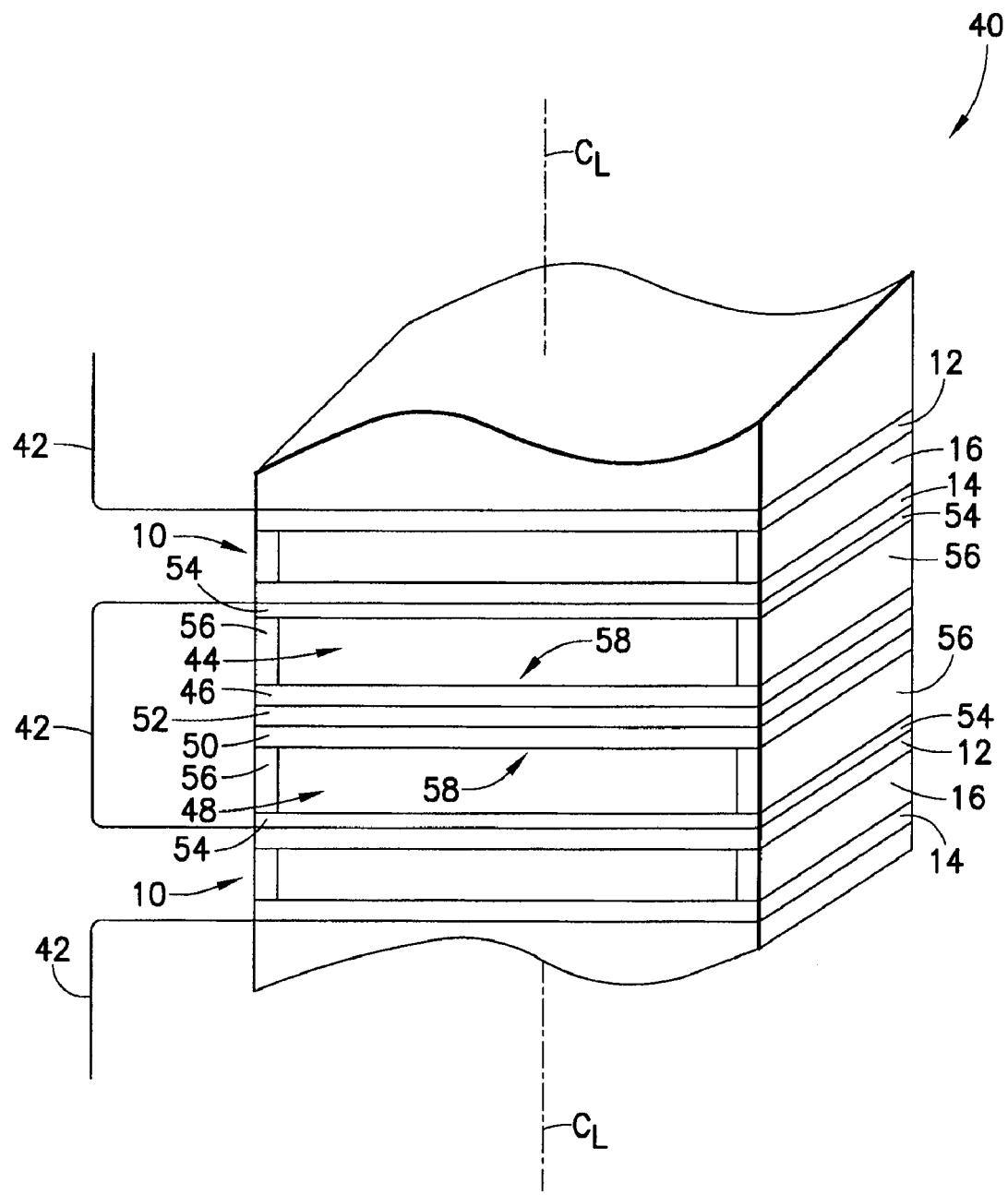
FIG. 5 illustrates a fuel cell stack.

As shown in FIG. 5 a fuel cell stack 40, for use in generating an electrical current, includes three fuel cells 42 stacked along a common axis CL. Each of the fuel cells 42 has a first conduit 44 disposed adjacent to an anode 46, a second conduit 48 disposed adjacent to a cathode 50 and an electrolyte 52 disposed between the anode and the cathode. The first conduit 44 and the second conduit 48 each have a base 54 and four generally opposing side walls 56 connected to one another to form a boxlike structure with one substantially open face 58 positioned generally opposite the base. The substantially open face 58 of the first conduit 44 is disposed adjacent to the anode 46 and the substantially open face of the second conduit 48 is disposed adjacent to the cathode 50. The first conduit 44 is in fluid communication with a fuel supply (not shown) and is configured to channel fuel to the anode 46 for reaction therewith. The second conduit 48 is in fluid communication with an air supply (not shown) and is configured to channel air to the cathode 50 for reaction therewith.

As shown in FIG. 5, the fuel cell stack 40 also includes one of the heat exchangers 10 disposed between adjacent fuel cells 42. As described in detail above, the heat exchanger 10 has the first and second plates, 12 and 14 respectively, and the side walls 16 which cooperate to form the enclosure 18 having the interior area 20 defined by the interior surfaces 22. Portions of the interior surfaces 22 of the first plate and the second plate 14 have the porous coating 24 applied thereon. The liquid metal (not shown) is disposed within the interior area 20 and/or the porous coating 24. The fuel cells 42 and the heat exchangers 10 are compressed together to ensure electrically conductive communication across the fuel cell stack. For simplicity of illustration, the fuel cell stack 40 is shown with three fuel cells 42. However, it is understood that typical fuel cell stacks include many fuel cells. Although the heat exchanger 10 is described as being disposed between adjacent fuel cells 42, the present invention is not limited in this regard as other locations for the heat exchanger, including but not limited to placement between groups of fuel cells can also be employed. While the first conduit 44 and a second conduit 48 are described as each having a base 54, the present invention is not limited in this regard as the base can be eliminated and side walls 56 of the first and second conduits can be secured to outside surfaces of the first and second plates, 12 and 14 respectively, without departing from the broader aspects of the present invention.

Figure 6:
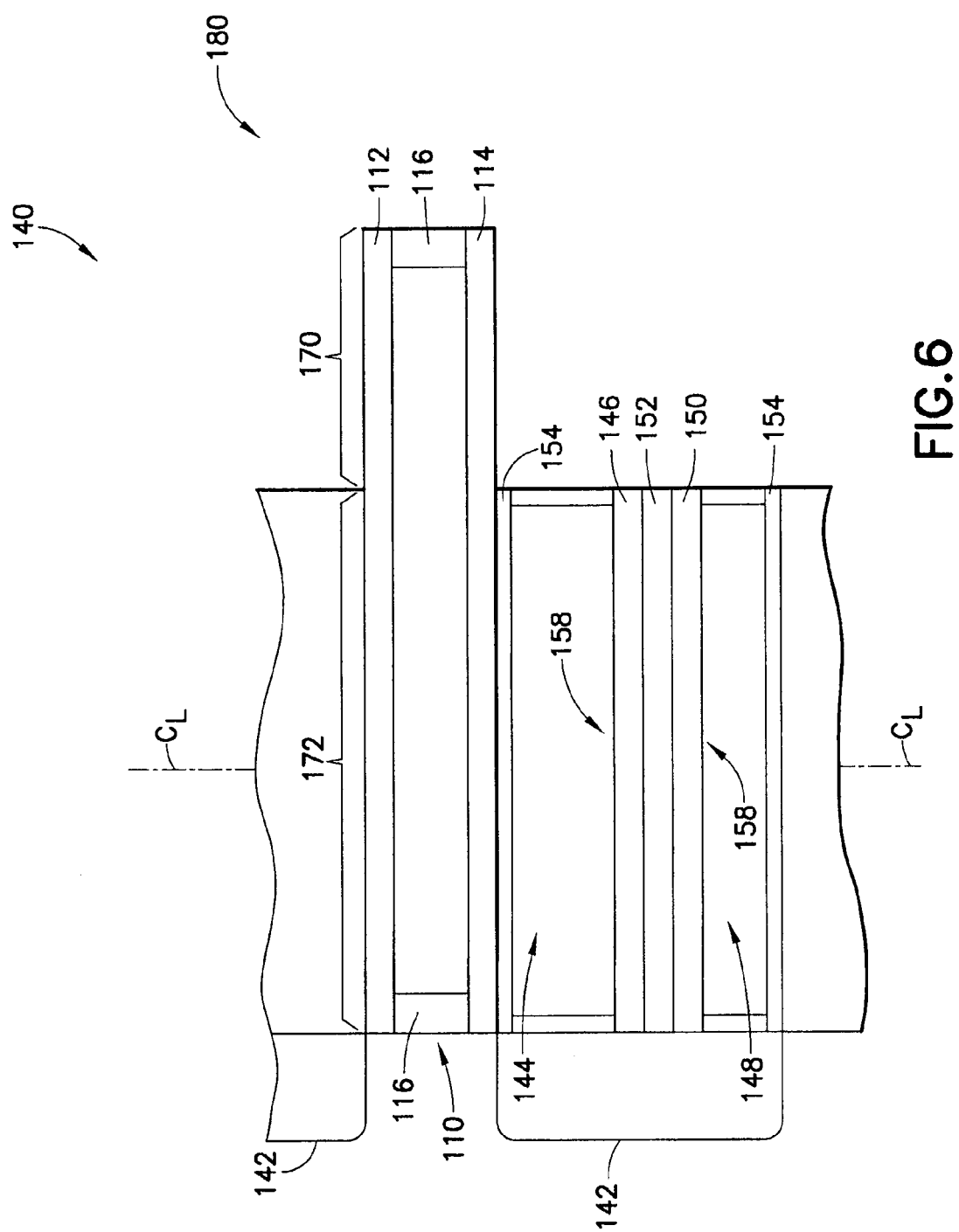
FIG. 6 is a front view of a portion the fuel cell stack having a heat exchanger with an extension.

The fuel cell stack of FIG. 6 is similar to the fuel cell stack 40 illustrated in FIG. 5. Therefore, like elements will be given like numbers preceded by the numeral 1. As shown in FIG. 6 a fuel cell stack 140 includes two fuel cells 142, similar to those described above, stacked along a common axis CL. The fuel cell stack 140 also includes a heat exchanger 110 having an extension 170 generally protruding from the fuel cell stack. The heat exchanger 110 also has an inner portion 172 disposed within the fuel cell stack 140 and is generally configured similar to the heat exchanger 10 described above.

Figure 7:
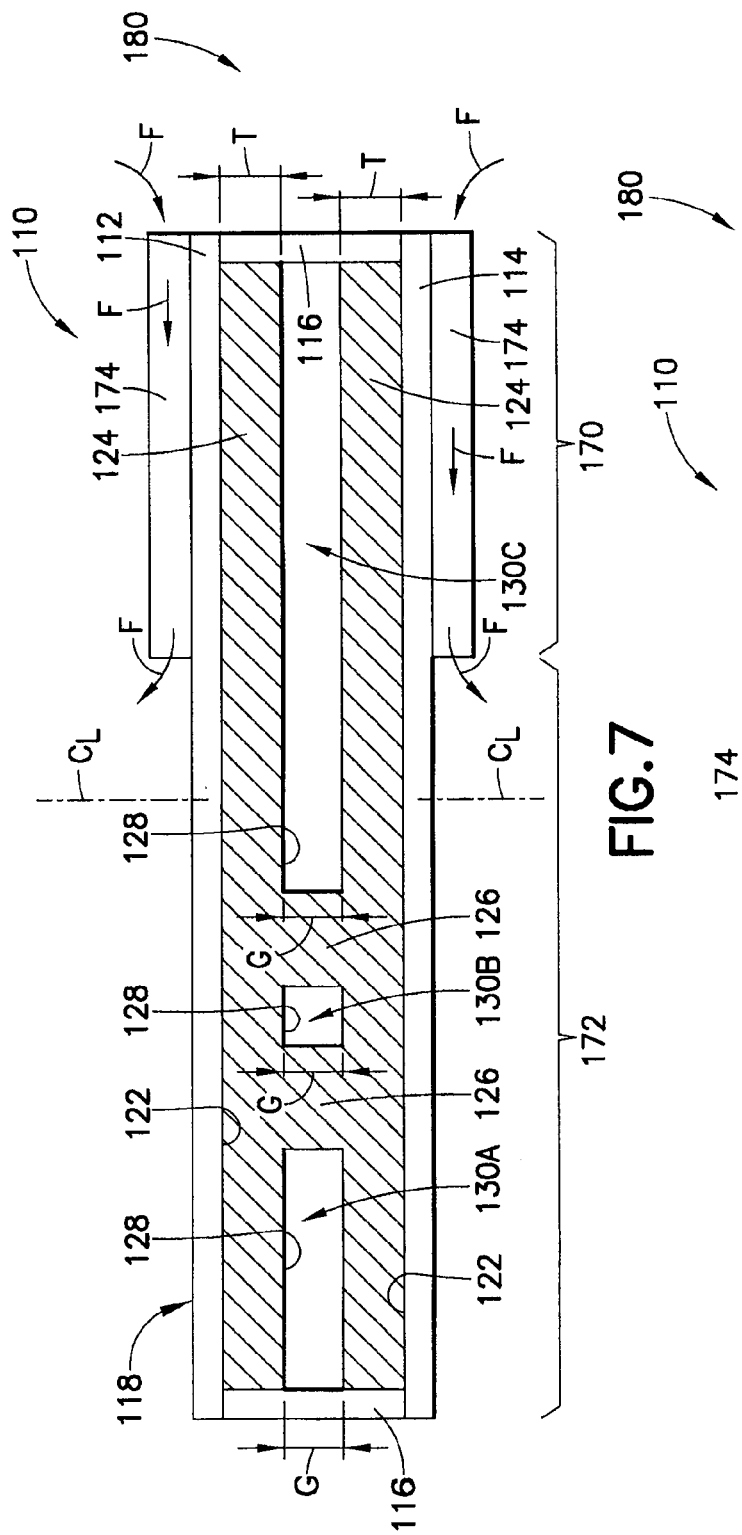
FIG. 7 is a front view of the heat exchanger of FIG. 6 with one wall removed.

As shown in FIG. 7, portions of the interior surface 122 of the first and second plates, 112 and 114 respectively, have a porous coating 124 of a thickness T applied thereon. The porous coatings 124 are spaced approximately equally apart from one another by three gaps G. In addition, two portions of the porous coatings 124 extend between the first and second plates, 112 and 114 respectively, and join one another to define two porous bridges 126. The porous coatings 124 and the porous bridges 126 also have exposed surfaces 128 which define three interconnected cavities 130A, 130B and 130C within the interior area 120. The cavities 130A, 130B and 130C accommodate phase changes of the liquid metal (not shown), for example, to accommodate evaporation of the liquid metal into a metal vapor (not shown). A portion of one of the cavities 130C is located in the extension 170. Preferably, the porous coatings 124 and the porous bridges 126 are metal, for example nickel. Preferably the porous coatings 124 and the porous bridges 126 are electrically and/or thermally conductive.

Figure 8:
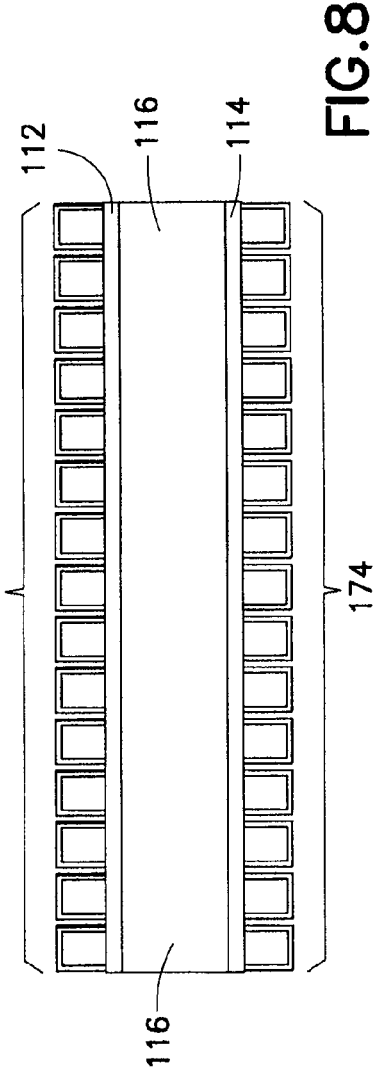
FIG. 8 is an enlarged end view of the extension of FIG. 7.

As shown in FIGS. 7 and 8, the extension 170 has fifteen substantially rectilinear tubes 174 brazed onto respective portions of the first and second plates, 112 and 114 respectively. The rectilinear tubes 174 are heat transfer fins through which air flows along paths designated by arrows F on its way to the second conduit within the cell stack adjacent to the cathodes. The rectilinear tubes 174 transfer heat from the heat exchanger 110 to the incoming air. In this way heat generated within the cell stack is transferred to the incoming air in a region outside the main body of the cell stack. This in turn results in the cells operating in a more isothermal condition thereby minimizing large thermal gradients. While the heat transfer fins are described as being rectilinear tubes 174, the present invention is not limited in this regard as any configuration of heat transfer fins, including but not limited to manifold assemblies, plates, ribbed foil and pins can be employed. Although the rectilinear tubes 174 are described as being brazed to the first and second plates, the present invention is not limited in this regard as other methods of securing the rectilinear tubes 174 to first and second plates, 112 and 114 respectively, such as but not limited to welding can be employed.

As shown in FIG. 9, a portion of the heat exchanger 10 of FIG. 4 cut along the common axis CL includes the first plate 12, the second plate 14, and one of the first side walls 16. The heat exchanger 10 also includes the porous coatings 24 and a cavity 30. The interior area 20 and/or the porous coating contain a liquid metal C and a metal vapor V.

As shown in FIG. 9 a graph 90 has an X axis corresponding to distance across the first and second plates, 12 and 14 respectively, and a Y axis corresponding to the temperature of the first and second plates. The graph 90 includes a first reference line BP parallel to the X axis and corresponding to a boiling point of the liquid metal. Temperatures above the first reference line BP are greater than the boiling point of the liquid metal and temperatures below the first reference line are less than the boiling point of the liquid metal.

As illustrated in FIG. 9 a second reference line R is drawn parallel to the Y axis and defines one area of the heat exchanger 10, generally referred to as an evaporation area M and another area of the heat exchanger, generally referred to as a condensation area L located on an opposing side of the second reference line. The evaporation area and the condensation area are in fluid communication with one another at least through the capillaries and the cavities. As described in detail below, during operation, the fuel cells heat at least portions of the evaporation area M to a temperature A2 greater than the boiling point of the liquid metal and at least portions of the condensation area L are cooled to a temperature A1 less than the boiling point of the liquid metal by cooler regions within adjacent fuel cells and/or a heat sink 180. For example, the heat sink 180 can be a source of air in thermal communication with the rectilinear tubes. While one evaporation area M and one condensation area L is described, the present invention is not limited in this regard it is understood that any number of evaporation areas and/or condensation areas can be employed without departing from the broader aspects of the present invention.

As shown in FIG. 9, heat is supplied to the evaporation area M by adjacent fuel cells (not shown) via heat-input paths generally designated by $H_{in}$. During operation, at least a portion of the heat is absorbed by the liquid metal C thereby increasing the temperature of the liquid metal. When the heat absorbed by the liquid metal is greater than or equal to a heat of evaporation of the liquid metal C, at least a portion of the liquid metal evaporates and forms the metal vapor V. The metal vapor V forces a portion of the liquid metal C from the capillaries (not shown) in the evaporation area M allowing the metal vapor V to exit the pores (not shown) and enter the cavity 30. A portion of the metal vapor V flows into the condensation area L where at least a portion of the heat is transferred from the metal vapor to cooler regions within the adjacent fuel cells via first heat-output paths generally designated by $H_{out1}$. In addition, another portion of the heat is transferred from metal vapor to the heat sink 180 via second heat-output paths generally designated by $H_{out2}$. Preferably, the heat sink 180 is an oxidant, for example air supplied to the fuel cells. When the heat transferred from the metal vapor reaches or exceeds a heat of condensation of the metal vapor V, at least a portion of the metal vapor condenses into the liquid metal C in the condensation area L. At least a portion of the liquid metal C enters the pores (not shown) within the condensation area L and flows through the capillaries (not shown) by capillary action. The liquid metal C further flows in the capillaries in the evaporation area M by capillary action to reduce the temperature of at least portions of the evaporation area M. Thus during operation, the metal vapor V and liquid metal C circulate around paths P between the evaporation area M and the condensation area L to maintain the differential temperature ΔT below a predetermined magnitude. Preferably, the differential temperature is eliminated and the fuel cell reaches approximately isothermal conditions to minimize stresses in and distortion of the fuel cell stack (not shown). Since the latent heat of evaporation for liquid metal is quite large, a small amount of metal evaporation removes a large amount of heat. For example the latent heat of evaporation for sodium is 1664 Btu per pound. This in turn means that the amount of liquid metal is small that moves by capillary action from the cool region back to the hot region.

As shown in FIGS. 6-8, the fuel cell stack 140 operates in a manner similar to the fuel cell stack 40 (FIG. 5). However, because the fuel cell stack 140 includes the extension 170 protruding from the fuel cell stack 140, the metal vapor V is preferentially condensed in the extension and the liquid metal C flows into the inner portion 172 where the liquid metal cools the evaporation area M. In addition, because the extension 170 protrudes from the fuel cell stack 140, preferably heat is transferred from the condensation area L to the heat sink 180 via the first heat-output paths $H_{out1}$ and/or the second heat-output paths $H_{out2}$.

The present invention also resides in a method for operating a fuel cell stack. The method includes the steps of providing a plurality of fuel cells stacked along a common axis. Each of the plurality of fuel cells includes a first conduit disposed adjacent to an anode, a second conduit disposed adjacent to a cathode and an electrolyte disposed between the anode and the cathode. A heat exchanger is disposed between adjacent fuel cells. The heat exchanger includes a first plate and a second plate, the first and second plates being connected to one another by at least one wall. The first and second plates and the at least one wall form an enclosure having an interior area defined by interior surfaces of the enclosure. At least a portion of the interior surfaces have a porous coating thereon. Portions of the porous coating extend between the first and second plates thereby defining at least one porous bridge. The porous coating and the porous bridges have exposed surfaces which cooperate with one another to define at least one cavity within the interior area. A liquid metal is disposed within at least a portion of at least one of the interior area, the cavities and the porous coating.

At least one of the fuel cells is heated to at least a boiling point of the liquid metal. Heat from the fuel cell is supplied to a portion of the heat exchanger. The portion of the heat exchanger being generally referred to as an evaporation area. At least a portion of the heat is transferred from the evaporation area into the liquid metal. At least a portion of the liquid metal then evaporates into a metal vapor. In addition, a coolant, preferably an oxidant, for example air, is flowed over another portion of the heat exchanger. The other portion of the heat exchanger being generally referred to as a condensation area. The evaporation area and the condensation area are in fluid communication with one another at least through the capillaries and/or the cavity. At least a portion of a heat is transferred from the condensation area into a heat sink, for example a source of air in thermal communication with a portion of the heat exchanger. Another portion of the heat is transferred to cooler regions of adjacent fuel cells. At least a portion of the metal vapor is transported from the porous coating into the cavity and is further transported to the condensation area where the metal vapor is condensed into the liquid metal. At least a portion of the liquid metal is then transported in the porous coating to the evaporation area, for example the liquid metal is transported in the capillaries defined by the porous coating.

In one embodiment of the present invention, the oxidant is preheated and supplied to the second conduit. In another embodiment of the present invention, a fuel is supplied to the first conduit where the fuel is preheated so that the fuel can be at least partially reformed in the first conduit.

Although the present invention has been disclosed and described with reference to certain embodiments thereof, it should be noted that other variations and modifications may be made, and it is intended that the following claims cover the variations and modifications within the true scope of the invention.

What is claimed is:

1. A heat exchanger for a fuel cell stack, said heat exchanger comprising:
a first plate;
a second plate;
said first and second plates being connected to one another by at least one wall;
said first and second plates and said at least one wall forming an enclosure having an interior area defined by interior surfaces of said enclosure;
at least one liquid metal disposed within said interior area; and
transfer means disposed within said interior area, said at least one liquid metal being caused to flow within said transfer means and said interior area in response to a temperature gradient applied to said enclosure.

2. The heat exchanger of claim 1, wherein:
said transfer means comprises at least one porous coating disposed on at least a portion of said interior surfaces;
said porous coating includes a plurality of capillaries therein, wherein at least a portion of said capillaries are connected to one another; and
said at least one liquid metal is transported by capillary action within said capillaries.

3. The heat exchanger of claim 2, wherein said porous coating comprises a metal.

4. The heat exchanger claim 2, wherein said porous coating is electrically conductive.

5. The heat exchanger of claim 1, wherein said porous coating extends between opposing portions of said interior surfaces forming porous bridges therebetween, said porous coating and said porous bridges having exposed surfaces which define at least one cavity within said interior area for accommodating phase changes of said at least one liquid metal.

6. The heat exchanger of claim 1, wherein said enclosure is electrically conductive.

7. The heat exchanger of claim 1, wherein said at least one liquid metal comprises at least one of sodium, potassium and a combination sodium and potassium.

8. A fuel cell stack, said fuel cell stack comprising:
a plurality of fuel cells stacked along a common axis, each of said plurality of fuel cells comprising a first conduit disposed adjacent to an anode, a second conduit disposed adjacent to a cathode and an electrolyte disposed between said anode and said cathode;

a heat exchanger disposed between adjacent fuel cells;

said heat exchanger comprising a first plate and a second plate, said first and second plates being connected to one another by at least one wall, said first and second plates and said at least one wall forming an enclosure having an interior area defined by interior surfaces of said enclosure;

at least one liquid metal disposed within said interior area; and transfer means disposed within said interior area, said at least one liquid metal being caused to flow within said transfer means and said interior area in response to a temperature gradient applied to said enclosure.

9. The fuel cell stack of claim 8, wherein said heat exchanger includes an extension protruding from said fuel cell stack.

10. The fuel cell stack of claim 9, wherein said extension discharges heat to an area outside of said fuel cell stack.

11. The fuel cell stack of claim 9 wherein said extension includes at least one heat transfer fin projecting outwardly therefrom.

12. The fuel cell stack of claim 8, wherein:

said transfer means comprises at least one porous coating disposed on at least a portion of said interior surfaces;

said porous coating includes a plurality of capillaries therein, wherein at least a portion of said capillaries are connected to one another; and said at least one liquid metal is transported by capillary action within said capillaries.

13. The fuel cell stack of claim 8, wherein said porous coating extends between opposing portions of said interior surfaces forming porous bridges therebetween, said porous coating and said porous bridges having exposed surfaces which define at least one cavity within said interior area for accommodating phase changes of said at least one liquid metal.

14. A method for operating a fuel cell stack, said method comprising the steps of:

providing a plurality of fuel cells stacked along a common axis, each of said plurality of fuel cells comprising a first conduit disposed adjacent to an anode, a second conduit disposed adjacent to a cathode and an electrolyte disposed between said anode and said cathode;

providing a heat exchanger disposed between adjacent fuel cells, said heat exchanger comprising a first plate and a second plate, said first and second plates being connected to one another by at least one wall, said first and second plates and said at least one wall forming an enclosure having an interior area defined by interior surfaces of said enclosure;

providing at least one porous coating on at least a portion of said interior surfaces and at least one liquid metal disposed in said porous coating;

heating at least one of said fuel cells to at least a boiling point of said liquid metal;

supplying heat from said fuel cells into an evaporation area of said heat exchanger;

transferring at least a portion of said heat from said evaporation area into said liquid metal;

evaporating at least a portion of said liquid metal into a metal vapor;

flowing a coolant over a condensation area of said heat exchanger;

removing at least a portion of said heat from said condensation area;

transporting at least a portion of said metal vapor from said evaporation area to said condensation area;

condensing at least a portion of said metal vapor into said liquid metal in said condensation area; and transporting said liquid metal to said evaporation area through said porous coating.

15. The method of claim 14, wherein said coolant is an oxidant which is preheated and supplied to said second conduit.

16. The method of claim 14, comprising the steps of:

flowing a fuel into said first conduit; and preheating said fuel for reformation thereof.

* * * * *